May 6, 1930.  G. C. GROENEVELD ET AL  1,757,858
WEED CUTTER
Filed Oct. 12, 1928   2 Sheets-Sheet 1
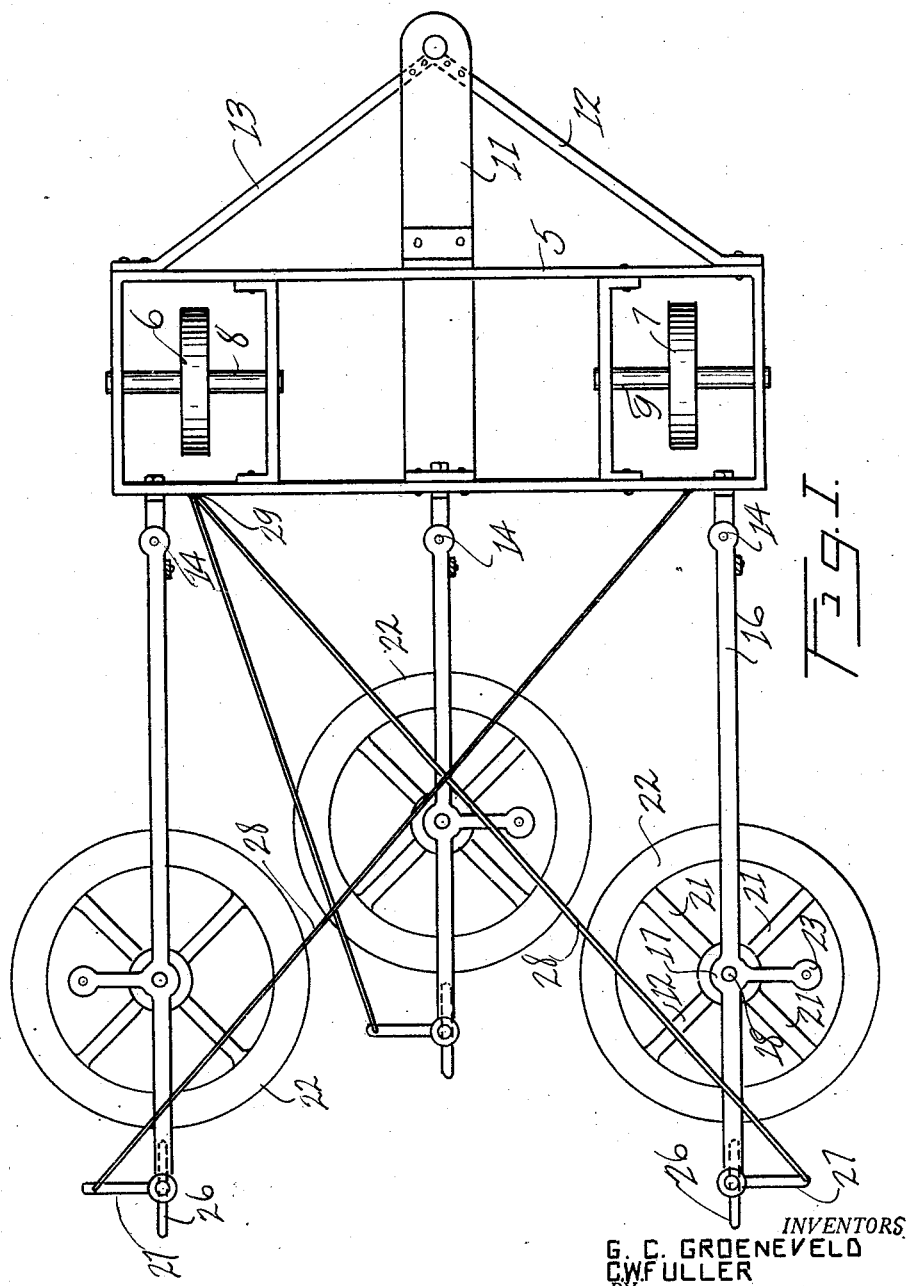

May 6, 1930. G. C. GROENEVELD ET AL 1,757,858
WEED CUTTER
Filed Oct. 12, 1928 2 Sheets-Sheet 2
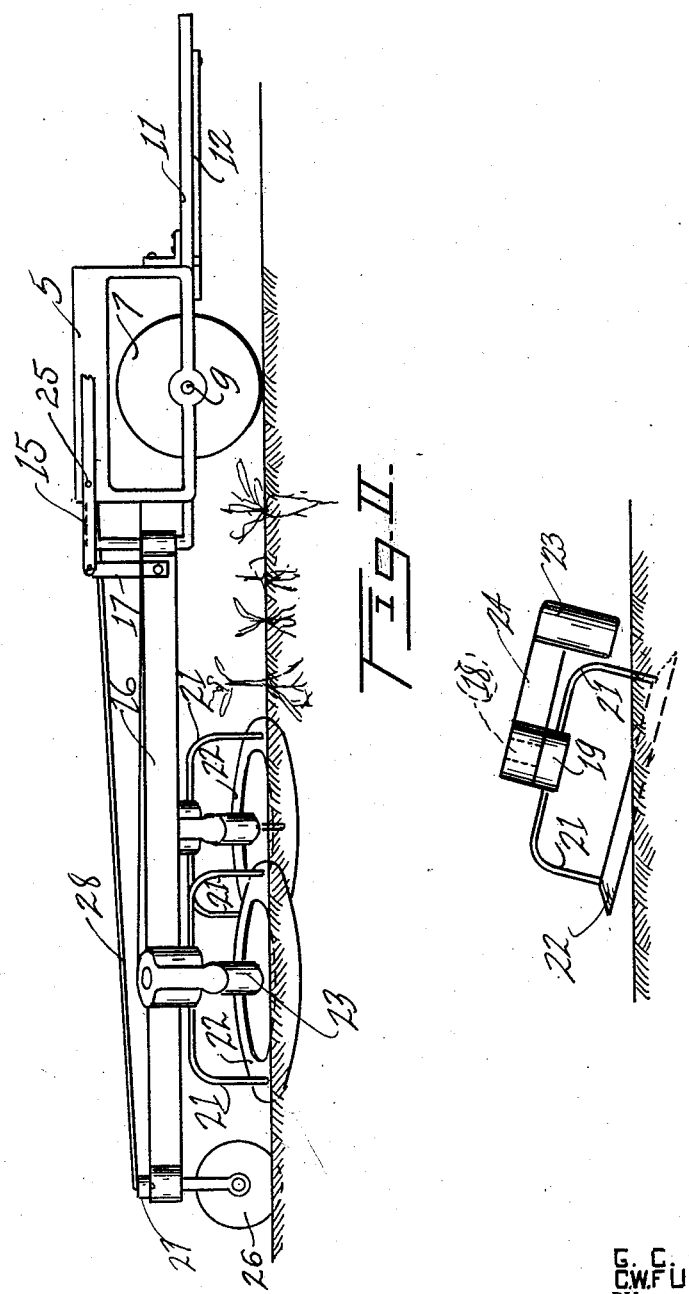
INVENTORS
G. C. GROENEVELD
C. W. FULLER
BY *Victor J. Evans*
ATTORNEY.

Patented May 6, 1930

1,757,858

UNITED STATES PATENT OFFICE

GOVERT C. GROENEVELD AND CHARLES W. FULLER, OF HANFORD, CALIFORNIA

WEED CUTTER

Application filed October 12, 1928. Serial No. 312,133.

This invention relates to improvements in weeding devices.

The principal object of this invention is to provide a weeder which will effectively cut weeds at a point beneath the surface of the ground and further a device which will not injure trees when employed in an orchard.

A further object is to produce a device of this character which may be drawn by a horse or by a tractor without altering the action of the device.

A further object is to produce a device of this character which may be automatically tracked.

A still further object is to provide a device which is simple in construction, economical to manufacture and well within the purchase price of the average user.

Other objects and advantages will be apparent during the course of the following description.

In the accompanying drawing forming a part of this specification, and in which like numerals are employed to designate like parts throughout the same, Figure I is a top plan view of our device, Figure II is a side elevation of Figure I, and Figure III is a rear elevation of one of the weed cutting implements, showing the position the same would assume when in operation.

At the present time there are weed cutters which are operated similar to a harvester having a horizontal actuating sickle bar which only cuts the tops from the weeds.

Applicants have devised a novel means for cutting the weeds at a point below the surface and a device wherein the cutter will not become dulled in any way near the same length of time as occurs with other types of weeders.

In the accompanying drawings wherein for the purpose of illustration is shown a preferred embodiment of our invention the numeral 5 designates a frame having wheels 6 and 7 carried upon axles 8 and 9, respectively. A draw bar is shown at 11 which is braced as shown at 12 and 13. The portion thus far described is merely a convenient frame to which the weeders may be pivotally attached, and it is obvious that any form of drawing means might be employed. As all of the weeders are identical, but one will be herein described.

At 14 we have shown a vertically disposed pintle upon which is pivoted a bar 16 which may be vertically lifted by a link 17 to which an arm 15 is attached. This arm is fulcrumed as at 25 to the frame 5. The bar 16 is provided with a bearing within which the stub end of a shaft 18 is rotatably secured. This shaft carries a head 19 from which arms 21 extend to a cutter 22, which cutter is curved in shape.

A weight is shown at 23 which is offset from the bar 16 by an arm 24 with the result that the bar is twisted a sufficient amount to cause one side of the cutter 22 to enter the ground so as to accomplish the cutting action. Pivoted to the rear extremity of the bar 16 is a tiller wheel 26 which has an arm 27 connected by a cross rod 28 to the opposite side of the frame 5 as shown at 29.

The result of this construction is that when the device is moved over a cultivated field, the cutters 22 will dig into the ground on the low side and cut the roots of any weeds which may be growing in the ground. Should the weeder be driven close to a tree, as for instance in an orchard, the cutter adjacent the tree may contact the same in which event it will merely roll around the periphery of the tree causing the rod 16 to pivot away from the tree which will be permitted through the flexing of the rod 28. Under ordinary conditions, the rod 28 will tend to keep the rod 16 in proper alignment with the wheels 6 and 7. As the frame is drawn, it will be apparent that the action through the rods 28 will cause the tiller wheels 26 to perform their object of tracking. Supposing that the device is being drawn to the right, the rod 28 connected to the lower corner of the frame 5 will tend to push the arm 27 thus causing the tiller wheel 26 to rotate upon its pivot. Therefore, as the wheels 6 and 7 start to turn the corner, the tiller wheel 26 will also start to turn the corner. The rods connected to the other tiller wheels and to the opposite corner of the frame 5 will function in the same manner.

With the ordinary type of weed cutter, when a sickle bar comes in contact with a tree, the bar will be sure to cause injury to the tree, while with applicants' device, the tree is not injured in any manner, and at the same time, their device permits close working about trees.

It is to be understood that the form of our invention herewith shown and described is to be taken as a preferred example of the same, and that various changes relative to the shape, size, material and arrangement of parts may be resorted to without departing from the spirit of the invention, or the scope of the subjoined claims.

Having thus described our invention, we claim:—

1. In a device of the character described the combination with draft means, of a bar pivotally secured thereto, a rotary cutter secured to said bar, weight controlled means for tilting said cutter so that one side thereof will be lower than the other for the purpose specified.

2. In a device of the character described the combination with a draft frame, of a bar pivotally secured to said draft frame, a bearing formed in said bar, a cutter wheel rotatably mounted beneath said bar, a weight carried by said bar for the purpose of flexing said bar thereby causing said cutter wheel to enter the ground over which said device is moving, and a tiller wheel secured to the free end of said bar whereby said pivoted bar is caused to track said draft frame.

3. In a device of the character described the combination with a draft frame, of a bar pivotally secured to said draft frame, a bearing formed in said bar, a cutter wheel rotatably mounted beneath said bar, a weight carried by said bar for the purpose of flexing said bar thereby causing said cutter wheel to enter the ground over which said device is moving, a tiller wheel secured to the free end of said bar for causing a tracking of said bar and said draft frame, an arm secured to said tiller wheel, and a rod extending from said arm to said draft frame at a point remote from the point of connection of said bar to said draft means.

In testimony whereof we affix our signatures.

GOVERT C. GROENEVELD.
CHARLES W. FULLER.